United States Patent [19]

Johansson et al.

[11] Patent Number: 4,752,507

[45] Date of Patent: Jun. 21, 1988

[54] RUBBER VULCANIZING AGENTS COMPRISING REACTION PRODUCTS OF SULFUR AND UNSATURATED HYDROCARBONS

[75] Inventors: Anders H. Johansson, Yardley, Pa.; Stephen K. Flanders, Woodstock, Ill.

[73] Assignee: Morton Thiokol, Inc., Chicago, Ill.

[21] Appl. No.: 111,840

[22] Filed: Oct. 21, 1987

Related U.S. Application Data

[62] Division of Ser. No. 781,827, Sep. 30, 1985.

[51] Int. Cl.$^4$ .................. B05D 3/02; C08C 19/20; C08G 75/14
[52] U.S. Cl. .................. 427/385.5; 106/287.32; 525/289; 525/290; 525/291; 525/332.6; 525/343; 525/185; 528/389
[58] Field of Search ............ 106/287.32; 427/385.5; 525/343, 289, 290, 291, 332.6, 185; 528/389

[56] References Cited

U.S. PATENT DOCUMENTS 3,997,355 12/1976 Santucci et al. ............ 106/287.32
4,290,816 9/1981 Ludwig et al. ............ 106/287.32
4,333,787 6/1982 Erickson .................. 156/307.3
4,387,167 6/1983 Kidwell, Jr. et al. ........ 501/140
4,426,453 1/1984 Gillott et al. .............. 501/84

Primary Examiner—Thurman K. Page
Attorney, Agent, or Firm—George Wheeler; Gerald K. White

[57] ABSTRACT

Reaction products of sulfur with an unsaturated reactant selected from d-limonene, 5-ethylidene-2-norbornene, styrene, and dicyclopentadiene, reacted at a temperature above the melting point of sulfur and below 159° C. until chemically combined, then further reacted above the melting point of sulfur until solidified. The resulting products serve as vulcanizing agents when compounded with rubber. The unvulcanized rubber compounds exhibit less blooming and better adhesion to a variety of substrates than rubber compositions compounded with soluble or insoluble sulfur. Vulcanizates containing the present compositions and a method for increasing the adhesion of rubber to a substrate during a vulcanization process are also disclosed.

7 Claims, 3 Drawing Sheets

RUBBER VULCANIZING AGENTS COMPRISING REACTION PRODUCTS OF SULFUR AND UNSATURATED HYDROCARBONS

CROSS-REFERENCE TO RELATED APPLICATIONS

This application is a division of U.S. Ser. No. 781,827, filed Sept. 30, 1985, now pending.

TECHNICAL FIELD

This invention relates to processes for reacting sulfur with an unsaturated hydrocarbon to form a copolymer which has utility as a vulcanizing agent for natural or synthetic rubbers. The invention further relates to vulcanizing agents, rubbers containing such vulcanizing agents, vulcanizing processes, vulcanizates made by reacting the vulcanizing agents with rubber, and a method for using the vulcanizing agents to improve the adhesion, blooming, and anti-scorch properties of rubber.

BACKGROUND ART

Vulcanization is an irreversible process during which a natural or synthetic rubber is reacted with sulfur or other vulcanizing agents, becoming less plastic and more elastic as a result. The usual vulcanizing agent is rhombic sulfur. Inorganic and organic accelerators are also added to rubber compounds to increase the rate and quality of curing. It has been found desirable to minimize the amount of rhombic sulfur in the unvulcanized composition, as rhombic sulfur is able to migrate to the surface of the rubber; this phenomenon is known as blooming. Blooming can reduce the adhesion of rubber to an adjacent layer of rubber or a substrate. For example, in pneumatic vehicle tires, adhesion between adjacent plies and adhesion of the rubber compound to textile, glass fiber, or metallic tire cords and belts is reduced by blooming, and separation of plies or other failure of the tire can result. Blooming can also mar the appearance of a molded rubber article.

One method to reduce blooming has been to use as a vulcanizing agent an allotropic form of sulfur with a reduced tendency to bloom. When rhombic or monoclinic allotropic forms of sulfur are heated to a temperature exceeding about 159° C. and then quenched rapidly, they are at least partially converted to amorphous sulfur. Since the rhombic and monoclinic allotropes are soluble in carbon disulfide and amorphous sulfur is not, the latter is known as "insoluble sulfur". Insoluble sulfur is sold under the trademark CRYSTEX by Stauffer Chemical Company, Westport, Conn.

Insoluble sulfur is a better vulcanizing agent than rhombic sulfur, but is not a complete solution to the problem of blooming. Insoluble sulfur is relatively unstable, and slowly reverts to the rhombic form when stored at room temperature. Reversion of insoluble sulfur either before or after it is compounded into a rubber composition results in blooming. Also, rubber compositions are prone to scorching if processed at an unduly high temperature. Consequently, a vulcanizing agent with reduced blooming and greater scorch safety would be very beneficial.

Copolymers of sulfur and various unsaturated hydrocarbons, for example terpenoids, styrene, and dicyclopentadiene, are known. Reissued U.S. Pat. No. 31,575, issued to Ludwig et al. on May 1, 1984 (the original patent is U.S. Pat. No. 4,290,816, issued Sept. 22, 1981), teaches as prior art an insoluble gel formed by reacting more than 5% dicyclopentadiene with sulfur at a temperature above 150° C. (column 2, lines 4–13). Ludwig, et al. characterizes this gel as an undesired product and teaches away from the incorporation of more than 5% dicyclopentadiene in such a composition.

The following U.S. patents teach reaction products of sulfur, dicyclopentadiene and (in some cases) other reactants as vulcanization agents or extenders for rubber:

| U.S. Pat. No. | Inventor | Issued |
| --- | --- | --- |
| 3,563,962 | Mirviss | February 16, 1971 |
| 3,544,492 | Taylor, et al. | December 1, 1970 |
| 3,523,926 | Mirviss | August 11, 1970 |
| 3,264,239 | Rosen, et al. | August 2, 1966 |
| 2,806,843 | Welch | September 17, 1957 |

Three patents known to the present inventors teach reaction products of dicyclopentadiene, sulfur, and other components having other utilities than as vulcanizing agents. These patents are:

| U.S. Pat. No. | Inventor | Issued |
| --- | --- | --- |
| 4,391,969 | McBee, et al. | July 5, 1983 |
| 4,190,460 | Cassar | February 26, 1980 |
| Re 31,575* * | | | cited previously

The Cassar patent, Example 1 (especially lines 59–61), teaches 20% dicyclopentadiene and 80% sulfur reacted at 160° C. to produce a brittle, glassy product. No reaction time is given.

Numerous patents teach reaction products of styrene, sulfur, and (in some instances) other materials. Those teaching utility of the resulting composition as a rubber additive are:

| U.S. Pat. No. | Inventor | Issued |
| --- | --- | --- |
| 3,544,492* | | |
| 3,259,598 | Solomon | July 5, 1966 |
| 3,231,546 | Bertozzi | January 25, 1966 |
| 2,989,513 | Hendry, et al. | June 20, 1961 |

*cited previously

The patents teaching other utilities for reaction products of styrene and sulfur are:

| U.S. Pat. No. | Inventor | Issued |
| --- | --- | --- |
| 4,311,826 | McBee, et al. | January 19, 1982 |
| 4,188,297 | Jayne, et al. | February 12, 1980 |
| 4,147,640 | Jayne, et al. | April 3, 1979 |
| 4,119,550 | Davis, et al. | October 10, 1978 |
| Re 31,575* | | |

*cited previously

Terpenoids such as camphene, d-limonene, and dipentene (optically inactive limonene) and various unsaturated bicyclic hydrocarbons have also been combined with sulfur, and in some instances the reaction product has been suggested as a vulcanizing agent. The pertinent references are:

| U.S. Pat. No. | Inventor | Issued |
| --- | --- | --- |
| 4,311,826 | McBee, et al. | January 19, 1982 |

| U.S. Pat. No. | Inventor | Issued |
|---|---|---|
| 4,190,460* | | |
| 4,147,640* | | |
| 4,097,474 | Askew, et al. | June 27, 1978 |
| 3,544,492* | | |
| Re 31,575* | | |

*cited previously

The Jayne '640 patent cited above, at column 3, lines 40-46, teaches a two-stage heating process for reacting hydrogen sulfide, sulfur, and various olefins such as dicyclopentadiene, styrene, and limonene. The examples disclose that the reaction yields a liquid product useful as a lubrication additive.

SUMMARY OF THE INVENTION

One aspect of the invention is a process for making vulcanizing agents. Starting materials comprising sulfur and an unsaturated reactant selected from d-limonene, 5-ethylidene-2-norbornene, styrene, and dicyclopentadiene are first reacted, preferably in a closed vessel, at a temperature greater than the melting temperature of sulfur, less than the minimum temperature at which pure monoclinic or rhombic sulfur rings are opened, and below the decomposition temperature of the unsaturated reactant. At atmospheric pressure, this corresponds to a temperature range from about 114° C. to less than about 159° C. The first step of the reaction is complete when substantially all of the unsaturated reactant is consumed, forming an intermediate product. The intermediate product is then heated in a second step to a temperature preferably exceeding the minimum temperature at which pure monoclinic or rhombic sulfur rings are opened, and less than the decomposition temperature of the unsaturated reactant. Under atmospheric pressure the preferred temperature is at least about 125° C., preferably greater than 150° C., more preferably from about 160° C. to about 180° C., most preferably from about 160° C. to about 170° C. The second stage reaction continues until the molten intermediate product is converted to a solid end product which is dispersible in rubber and provides less sulfur bloom than insoluble sulfur when incorporated in a rubber composition.

A second aspect of the present invention is accomplished by combining the above intermediate product with an antioxidant, a reodorant, or a process oil, either singly or in any combination. The second step is then carried out, forming an end product having a reduced or improved odor, or improved processing characteristics.

A third aspect of the invention is a vulcanizing agent made according to the preceding process. The structure of the agent is not presently known, but it is believed to consist essentially of reacted or physically bound sulfur with very little tendency to revert to a free form capable of migrating to the surface of a rubber composition. X-ray crystallographic studies show the material is essentially noncrystalline.

A fourth aspect of the invention is a vulcanizate comprising the reaction product of a natural or synthetic rubber and a product made according to the preceding process. An unvulcanized rubber composition containing the present vulcanizing agent, a method for vulcanizing rubber, and a method for increasing the tack of unvulcanized rubber with enhanced scorch safety are further aspects of the invention.

DETAILED DESCRIPTION OF THE INVENTION

Vulcanizing Agent

Figure 1:
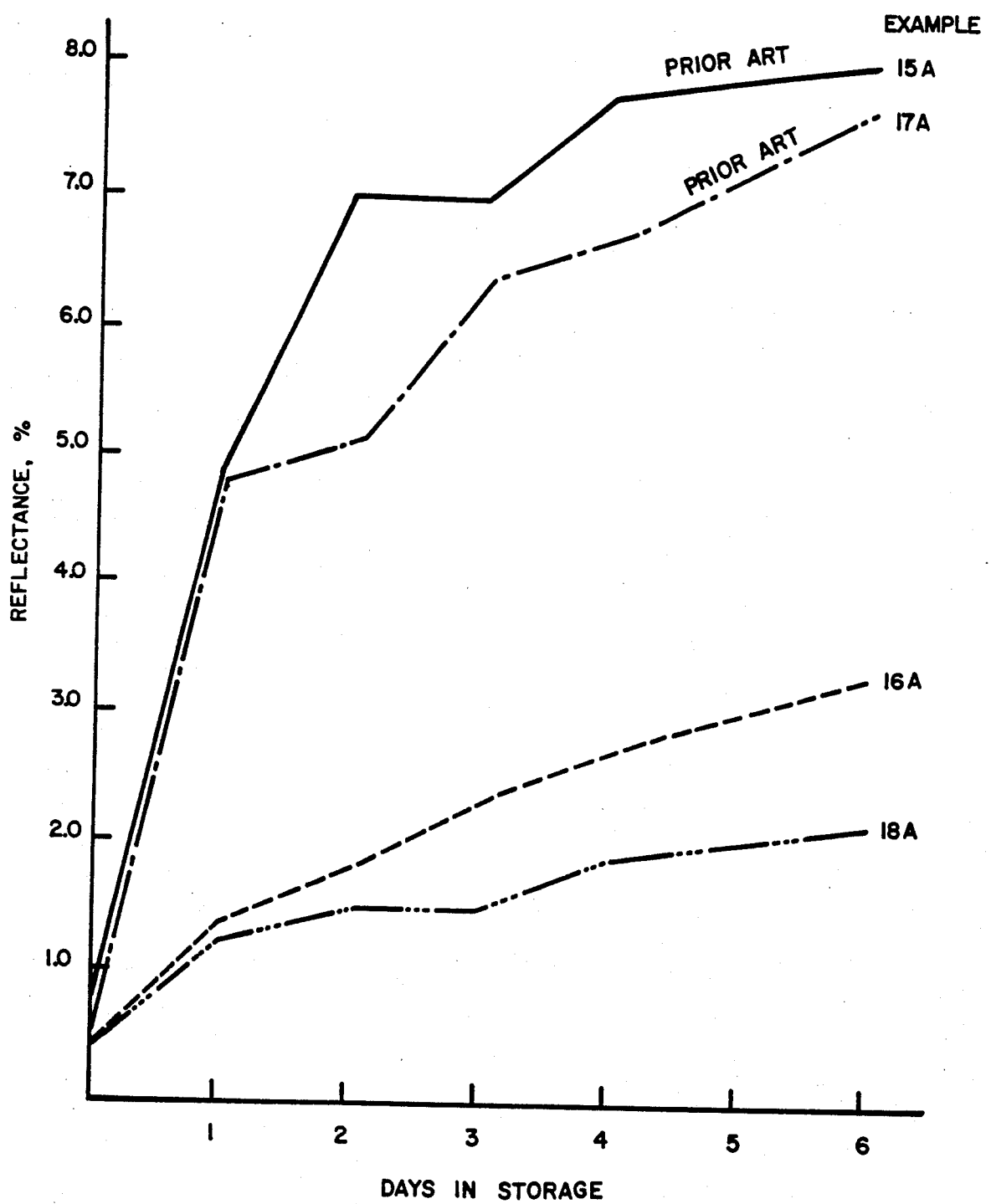
FIG. 1 is a plot of the reflectance (blooming) vs. storage time data set forth in Table IXA, Examples 15A, 16A, 17A, and 18A, illustrating that for compositions containing two different accelerators, the prior art rubber compositions (top two plots) consistently blooms more than the present compositions (bottom two plots).

The preferred starting materials contemplated for use herein are molten sulfur and any of the olefinic materials described in the Summary. All of these ingredients are available from standard commercial sources, such as Alfa Products, Danvers, Mass. Besides the specifically enumerated unsaturated reactants, the inventors contemplate that other unsaturated reactants which form compounds or copolymers with sulfur will also be useful to form equivalent non-blooming vulcanization agents.

The preferred proportions of sulfur and the unsaturated reactant are those which maximize the available sulfur while exhibiting good dispersion characteristics. Just enough of the unsaturated reactant is present to prevent blooming. Based on these considerations, the proportion of sulfur in the reaction mixture is from about 75% to about 90% by weight, preferably from about 75% to 85% by weight for the best bloom resistance, while the proportion of the unsaturated reactant is from about 10% by weight to about 25% by weight. (All parts, percentages, and proportions herein are by weight unless otherwise indicated.)

Various adjuvants may be added to the reaction mixture before or during the reaction to modify the properties of the final product, or to reduce odor during processing. Adjuvants specfically contemplated for use herein include reodorants, antioxidants, and process oils. A specifically contemplated reodorant is about 0.1% of RHODIA A-300, available from Florasynth Inc., New York City, N.Y. Up to about 1% of a reodorant is contemplated within the scope of the invention. An antioxidant contemplated for use herein is AGERITE GELTROL, sold by B. F. Goodrich Chemical Company, Cleveland, Ohio. 0-2%, preferably about 1%, of the antioxidant is comtemplated within the scope of the invention. A specific process oil contemplated for use herein is FLEXON 340, a trademark for a petroleum process oil sold by Exxon Corp., New York City, N.Y.

One specific formulation contemplated for a vulcanizing agent is the reaction product of about 80% sulfur, about 18% dicyclopentadiene, and about 2% FLEXON 340 process oil.

Conventional process equipment can be used to practice the present invention. The vessel for the first step of reacting sulfur with the unsaturated reactant can be a 25 gallon (approximately 100 liter) stainless steel reactor equipped with an agitator and a heated hot oil jacket. For larger scale practice, a 500 gallon (approximately 2000 liter) or larger batch reactor or a continuous flow reactor is contemplated. All of the reactants are preferably supplied as liquids so they can be pumped into the reactor. As is conventional, an outlet tap may conveniently be provided at the bottom of the reactor to release its contents at the conclusion of the first stage of reaction.

The second step of the reaction, wherein the liquid reaction mixture is solidified, can be carried out in several ways. One method of carrying out the second step is to pour the liquid product of the first step into a shallow vessel; heat the vessel in an oven to provide the desired temperature, resulting in a solidified slab of reaction product; quench the slab in an excess of water; convert the solid material into particles by breaking the slab into smaller pieces and crushing the pieces into small particles; and grade the particles. A convenient particle size range is through number 18, on number 60 (United States Standard Sieve Series). This range includes particles which pass through a wire sieve having 1.00 mm. square openings between 0.580 mm diameter wires, and are retained on a wire sieve having 0.25 mm. square openings between 0.180 mm diameter wires.

A second method for carrying out at least a portion of the second step is to charge the product of the first stage of reaction into a pressure vessel containing superheated liquid water having a temperature of at least about 125° C., preferably at least about 150° C., more preferably at least about 160° C., held at an elevated pressure, such as a gauge pressure of about 90 pounds per square inch (62 Newtons per square centimeter). The water and reaction mixture are agitated to provide a suspension of the first stage product in water. When the reaction is advanced or (preferably) complete, discrete beads of the reaction product remain; these are separated from the water. With proper selection of time, temperature, and agitation conditions, particles of the vulcanizing agent of the desired size can be formed directly.

A third method contemplated for carrying out at least a portion of the second step of the process invention is to charge the product of the first step into an extruder, which is operated to mechanically work the intermediate product, thereby heating the material to the desired temperature for the second stage reaction. Direct heat can optionally be provided before, during, or after the extrusion step to maintain the necessary reaction temperature. The residence time in the extruder is arranged so the reaction product reaches an extrusion die at the extruder outlet while still sufficiently plastic to be extruded. The noodles of material which leave the extruder can be sheared at the die or otherwise subdivided to provide uniform particles of the vulcanization agent.

The primary process parameters which must be controlled are the time and temperature of reaction. For the first stage of reaction, in which the unsaturated reactant and sulfur are combined to form an intermediate product, the reaction temperature should exceed the melting point of sulfur and should be less than the temperature at which molten sulfur rapidly increases in viscosity. At atmospheric pressure this temperature is about 159° C. Consequently, the preferred reaction temperature for forming the intermediate product is from about 114° C. to about 159° C., preferably no more than 140° C., and most preferably about 125° C. The higher the reaction temperature, the more quickly the reaction proceeds. A convenient way to measure the progress of reaction is by periodically determining the viscosity of the reaction mixture. The reactants are water-like at the beginning of the reaction, and increase in viscosity to about 6.5 to 7 poises at the conclusion of the first reaction step. Another method for determining the extent of reaction is to analyze the reaction mixture for presence of the unsaturated reactant which is consumed during the first stage of the reaction.

During the second stage of the reaction the intermediate product is maintained at a temperature of at least about 125° C., preferably slightly exceeding 159° C., resulting in solidification of the reaction product. A temperature exceeding 159° C. is preferred because the second stage reaction requires about 75 minutes at 162° C. and roughly 24 hours at 125° C. The upper limit of temperature for the second stage reaction depends on the dispersibility of the end product in rubber compositions. If the second stage of the reaction proceeds too long, or at too high a temperature, the end product becomes insufficiently, dispersible in rubber compositions to provide an evenly vulcanized rubber composition, then vulcanized particles can contribute to premature failure of a vulcanizate. One particular reaction temperature contemplated within the scope of the present invention is about 163° C. Completion of reaction may be confirmed empirically by formulating the reaction product in a rubber composition and measuring its dispersion and blooming characteristics. The final product blooms less than insoluble sulfur. Still another gauge of completion of the second stage reaction is whether the reaction product has a substantial component insoluble in carbon disulfide. The typical end product is less than 50% soluble in carbon disulfide.

The order of addition of the unsaturated reactant and sulfur is not considered critical, although it is believed desirable to maintain an excess of sulfur at all times during the first stage of reaction. The unsaturated reactant is thus encouraged to react with the sulfur, rather than evaporating or reacting with itself.

It is preferred to cleanly terminate the reaction by quenching the end product. The quenching apparatus contemplated herein may be as simple as a stationary bath of water, optionally provided with a conveyer to move the finished reaction product through the water. A fluid spray is also contemplated to provide quenching water or another suitable quenching liquid. If the second step reaction is conducted in water suspension in a pressure reactor, the reaction product can be "quenched" by relieving the pressure in the reactor, which in turn reduces the temperature within the reactor.

Raw Rubbers

The rubbers useful as ingredients in the vulcanizates of this invention include, but are not limited to, rubbery materials having available unsaturation, such as natural and synthetic vulcanizable rubbers and the rubbery polymers of dienes, preferably of open-chain conjugated dienes having from 4 to 8 carbon atoms. Specific examples of rubbery materials useful in this invention, like whose specified in U.S. Pat. No. 2,989,513, issued to Hendry, et al. on June 20, 1961, are natural rubber, which is essentially a polymer of isoprene, polybutadiene-1,3, polyisoprene, poly-2,3-dimethyl-butadiene-1,3, polychloroprene and the like, the "synthetic natural" rubbers such as cis-1,4 head-to-tail polyisoprene and other polymers obtained from 1,3-dienes by means of directive polymerization, or the rubbery copolymers, terpolymers, and the like of these and similar conjugated dienes with each other or with at least one copolymerizable monomer such as isobutylene, styrene, acrylonitrile, methyl acrylate, ethyl acrylate, butyl acrylate, methyl methacrylate, 2-vinyl pyridine, 4-vinyl pyridine, and the like. For the purposes of this invention balata and gutta percha, which are polyisoprene isomers, and the like which contain available unsaturation are to be considered as curable rubbers.

Still other rubbery materials can be used in the practice of this invention, such as unsaturated polymers containing acid groups obtained by the copolymerization of a major amount of an open-chain aliphatic conjugated diene with an olefinically unsaturated carboxylic acid by the reaction of a polymer of a diene with a carboxyl supplying reagent (preferably in the presence of a catalyst), by the copolymerization of a diene with an olefinically unsaturated copolymerizable compound hydrolyzable to form an acid group, and by copolymerization of an alkyl ester of an acrylic type acid with a polyolefinically unsaturated carboxylic acid. Still other rubbers can be employed such as polymers formed by the copolymerization of dienes with alkyl acrylates and by the polymerization of an alkyl acrylate with at least one other polyolefinically unsaturated monomer followed by hydrolysis.

Rubbery polyesterurethanes, polyetherurethanes, and polyesteramideurethanes having curable double bonds or available unsaturation and rubber reclaimed from the foregoing can also be used. Mixtures of two or more of the foregoing rubbers may be employed as ingredients in the vulcanizates of this invention. The preferred rubbers are the natural and synthetic polyisoprenes, the polybutadienes, the polychloroprenes, and the copolymers of isobutylene with isoprene, butadiene-1,3 with styrene, and butadiene-1,3 with acrylonitrile.

Vulcanizable Compositions

The vulcanizable compositions of this invention comprise as essential ingredients a major proportion of a single rubber or a mixture of two or more rubbers as herein described and a minor proportion of one or more of the vulcanizing agents described previously. Other appropriate compounding ingredients such as reinforcing agents, fillers, accelerators, plasticizers, antioxidants, age resistors, resins, dyes, color pigments, fungicides, adhesion promotors, and the like may be employed in the rubber compositions disclosed herein in the amounts customarily employed in the rubber industry, depending upon the ultimate use of the product. The vulcanizing agents of this invention are used in the same proportions (based on sulfur weight) as rubbermakers' sulfur or insoluble sulfur. From about 1 to about 12 parts of vulcanizing agent per one hundred parts of rubber are contemplated, and the preferred proportions are from about 1 to about 4 parts of vulcanizing agent per one hundred parts of rubber.

Vulcanization Process

The rubber stocks containing the curing agent and other appropriate compounding ingredients are mixed on a mill or in any other suitable mixing device, and the resulting blends are preferably cured at temperatures of from about 260° F. to about 360° F. (127° C. to 182° C.), and preferably at from about 280° F. to about 320° F. (137° C. to 160° C.). These vulcanization conditions are substantially those of the prior art. The present vulcanizates are particularly useful for applications in which adhesion to a substrate is important, as in pneumatic vehicle tires. In tires, the vulcanizate is positioned adjacent and in intimate contact with another rubber layer, tire cord material, brass-plated steel belting, or other substrates, and vulcanized.

EXAMPLE 1

200 pounds (91 kg.) of molten sulfur were charged to a 300 pound bulk reactor held at 125° C., plus or minus 3° C. 35 pounds (15.9 kg.) of dicyclopentadiene were charged slowly into the reactor over a 30 minute period. The dicyclopentadiene (supplied at room temperature) was added slowly enough that it neither cooled the reaction mixture nor reacted rapidly enough to increase the temperature of the reaction mixture. After addition of dicyclopentadiene was complete, the reaction mixture was maintained at the indicated temperature, with mechanical stirring, for three hours. The liquid intermediate product thus formed contained substantially no free dicyclopentadiene, as indicated by the lack of dicyclopentadiene odor.

The intermediate product was discharged from the reactor into aluminum trays, each having tapered sides and each approximately 12 inches (30 cm.) by 18 inches (46 cm.) by 3 inches (8 cm.) deep. The intermediate product was poured about 2 inches (5 cm.) deep, providing about 20 to 25 pounds (9 to 11 kg.) per tray. The trays were placed in a prewarmed oven maintained at 170° C., and the reaction time was considered to have begun when all of the trays reached 160° C. The second stage reaction was complete when 60 minutes had elapsed. (In other trials, a reaction time of 40 minutes was found insufficient to fully cure the product, while a reaction time of 80 minutes was too long to provide an optimal cure.)

After the second stage of reaction was completed, the trays were taken from the oven and the slabs of the end product were dumped into a water bath to quench them. After being allowed to set for 24 hours, the material became a moderately friable solid at room temperature. The slabs were then manually broken with a hammer and milled to form particles, substantially all of which passed through a number 18 screen and were retained on a number 60 mesh screen (U.S. Standard Sieve Series).

EXAMPLE 2

In this example, the procedure set forth in Example 1 was followed, except the sulfur content was increased from 85% to about 88% by employing as starting materials 200 pounds (91 kg.) of sulfur and 27 pounds (12 kg.) of dicyclopentadiene. Substantially the same results were obtained, except that the amount of available sulfur in the product was increased.

EXAMPLE 3

The experiment of Example 1 is repeated, except that the dicyclopentadiene is replaced with an equivalent weight of each of the materials set forth in Table I in independent trials. The end products have properties comparable to those of the product of Example 1.

EXAMPLES 4–7

The product of Example 1 was formulated into four rubber compositions, respectively identified as Examples 4–7, to perform an adhesion test. The ingredients used for these and later examples are identified in Tables IIa and b. The formulations for these examples are given in Table III. No adhesion promoters were included in these formulations, to avoid masking the differences in adhesion between the formulas.

A 700 pound (317 kg.) masterbatch was prepared by mixing ingredients A through G, in the proportions indicated in Table III, in a Banbury mixer. Ingredient H—the accelerator—was added at the end of the mix. Eight 2.5 kg. portions were taken from the masterbatch, then one of ingredients I, J, or K was milled with each portion to form compositions 4–7 stated in Table III. Two samples of each formulation were prepared in an oil-heated 18" two-roll mill according to the procedure which follows.

First, the mill was set to a nip of 6 mm and preheated to 104° C., as measured with a surface pyrometer. Then a portion was banded on one roll, maintaining a low rolling bank, for three to four minutes (total elapsed time). (The elapsed time exceeding two minutes was made up by shortening subsequent milling steps.) The vulcanizing agent was added across the rolling bank, while mixing continued for two more minutes. The stock was then cut and cross-blended from each side of the mill, ending with a roll at the end of three minutes. The rolled batch was passed endwise through the mill, rerolling with each pass, for a total of three minutes. The stock was sheeted off, each side was covered with a polyethylene film, and the stock was laid out on a metal table to cool. From sheeting off, this step was performed in two minutes. The total mill time was 12 minutes.

Each processed portion was molded in accordance with ASTM D 2229-80, except that a transfer mold was used, and a 2 mm metal shim was placed in the mold cavity prior to transferring material from the pot to the mold cavity. This was done to prevent the mold from underfilling. Fifteen wires were molded into each sample, at an imbedded depth of 12.5 mm, after being degreased in butanone. During molding, a 1 kg. weight was suspended from each wire in the mold to keep it taut. Each sample was molded at 150° C. using +90 cure times commonly used in the industry, but allowing an extra four minutes' cure time because of the test piece thickness. The molded samples of each Example were divided into four groups; each group was then aged differently as shown in Table IV.

Wire adhesion was measured for each formulation and type of aging according to ASTM 2229-80 by measuring the force required to pull the wires out of the samples. A pulling rate of 50 mm per minute was used, and the adhesion values for the 15 wires in each sample were averaged to obtain the mean and treated statistically to obtain the standard deviation. The data is presented in Table V. Looking first at the steam-aged samples in order of adhesion, Example 6 (5 pphr of Example 1 vulcanizing agent) provided the greatest adhesion, followed by Example 7 (4.75 pphr of Example 1 curing agent), Example 5 (rubbermakers' sulfur) and Example 4 (CRYSTEX). The humidity-aged samples also show that the formulas of Examples 6 and 7, according to the present invention, provided better adhesion than prior art Examples 4 and 5. The thermally aged samples show better performance according to the prior art than with the Example 1 curing agent, while for the unaged samples rhombic sulfur (5) did the best and insoluble sulfur (4) and the Example 1 curing agent (6) and (7) did about equally well. The fairly large standard deviation values indicate that more extensive testing was required before solid conclusions could be reached for the thermally aged, humid aged, and unaged samples, but the adhesion performance of the present vulcanizing agents under steam aging conditions was clearly superior to that of insoluble sulfur or rhombic sulfur.

EXAMPLES 8–13

In these examples the blooming characteristics of rubber compositions containing insoluble sulfur, versus rubber compositions containing various proportions of reaction products of dicyclopentadiene and sulfur, were compared. The ingredients employed, and their commercial sources, are set forth in Table II, and the proportions of ingredients in the compositions of the examples are set forth in Table VI. Vulcanizing agents U, V, W, and X were made according to Example 1, except that the proportion of dicyclopentadiene was varied as indicated in Table IIa.

Ingredients in Table VI were first compounded according to conventional practice to provide strips of a masterbatch. For each sample, 50.0 grams of masterbatch strips were fed into a Brabender, which was set for X5 sensitivity selection, a measuring range of 1:5 (0–5000), a rotor speed of 32 rpm, and a shift position of 0. The masterbatch was mixed for a short time, until it reached a temperature of 104° C.

Next, ingredient T and the selected vulcanizing agent (one of ingredients I, O, U, V, W, or X) were added in sequence. The amount of vulcanizing agent used was enough to provide 4 pphr of sulfur. As soon as the vulcanizing agent was pulled into the mixing chamber, the ram of the Brabender was inserted and the recording chart was marked to indicate a mixing time of 0.

The mixing time was independently determined for each formulation, as follows. A first, preliminary sample of the formulation was mixed, using material I as a control, and the mixing torque required was recorded. The torque would first drop, then level off, and finally begin to increase as the control sample began to vulcanize. The mixing time for the series of test samples was the interval between 0 and the beginning of the viscosity increase in the control sample, which was replicated in the series. The mixing temperature was selected to be representative of factory conditions. Typical mixing conditions in these runs were 3 minutes at 220° F. (104° C.), 2.5 minutes at 240° F. (116° C.), or 2 minutes at 260° F. (127° C.). The mixing times and temperatures were selected to provide a thoroughly mixed, essentially unvulcanized formulation.

Immediately following mixing, each sample was quickly removed from the Brabender and quenched in a bath of cool water to arrest curing, and dried overnight under a hood at ambient temperature. The dried sample was passed six times through a tight two-roll mill to warm it; then the mill was opened and the sample passed through twice more to produce a rounded disc about 3 to 3.5 inches (7.6 to 8.9 cm.) in diameter. The sample was sandwiched between two sheets of MYLAR polyester film (MYLAR is a trademark for polyester film sold by E. I. duPont de Nemours & Co., Wilmington, Delaware) and placed in a preheated (80° C.) 6 inch (15 cm) square tensile slab mold. The mold was placed in a hydraulic press and pressed three times. The first time the force was raised to about 20,000 pounds (9,000 kg.), providing a pressure of 556 psi (383 N/cm²), then immediately released. The second time the pressure was raised to about 25,000 pounds (11,000 kg, or 695 psi (479 N/cm²), and again released. Finally the pressure was raised to 30,000 pounds (14,000 kg), or 830 psi (572 N/cm²) held for sixty seconds, then released. The sample (with MYLAR sheets still in place) was quenched in water. Then the MYLAR sheets were peeled away and the sample was oriented with its smoothest side up and placed on a sheet of polyethylene film.

Three surface conditions were provided on portions of each sample. One surface, denoted as a smooth surface (SS), was the original, untouched upper surface of the slab. A second surface (scraped or "SC") was formed by abrading one side of the slab with a spatula to roughen the surface. A third surface (FP, for "fingerprint") was formed by touching the smooth upper surface of the sample with one's finger.

The samples were then aged on separate shelves of a dust-free cabinet and each of the three surfaces was examined after 1, 2, and 4 days with a low-power microscope for evidence of blooming. Blooming was graded as follows each day. First, the Example 8 (prior art) samples were graded for blooming. "0" represents no bloonming—an ideal surface. "—10" represents extreme blooming. Second, the samples for Examples 9–13 were compared to the Example 8 samples. In this comparison, a value of "0" indicates blooming equal to that of Example 8, and positive and negative values mean less or more blooming than that of Example 8 for the same type of surface. The absolute blooming values for Example 8 and the relative blooming values for the samples of Example 9 (better prior art) and Examples 10–13 (according to the present invention) are reported in Table VII. Table VIII reports the date of Table VII, modified by adding the value from Example 8 to the values in the same column for Examples 9–13. The original values for Example 8 are reported in Table VIII. The values reported in Table VIII thus vary from 0—no blooming—to—10, just like the Example 8 data in Table VII.

Example 8, containing, insoluble sulfur, bloomed noticeably the first day and substantially by the fourth day for all three surface treatments. Example 9, containing a slightly different form of insoluble sulfur, generally bloomed to about the same degree as Example 8, but bloomed more heavily than Example 8 by the fourth day. Each sample of Examples 10 and 11 according to the present invention showed substantially no bloom on any surface until the fourth day, when very slight blooming was noted of FP—the surface normally nost sensitive to blooming. Examples 12 and 13 showed somewhat more blooming than Examples 8 and 9, thus showing that preferred vulcanizing agents for bloom reduction will have less than 85% sulfur. A lower percentage of sulfur in the vulcanizing agent thus provides less blooming, even though sulfur content is equalized for examples 8–13.

EXAMPLE 14

16.9 pounds (28 kg.) of molten sulfur were charged to a 5 gallon (20 liter) reaction vessel held at 125° C. (plus or minus 3° C.). 1.5 pounds (0.68 kg.) of FLEXON 340 was added. Then 13.1 pounds (5.9 kg.) of dicyclopentadiene at room temperature was added over a 30 minute period. The dicyclopertadiene was added slowly enough that it neither cooled the reaction mixture nor reacted rapidly enough to increase the temperature of the reaction mixture. After addition of dicyclopentadiene was complete, the reaction mixture was maintained at the indicated temperature, with mechanical stirring, for three hours. The liquid intermediate product thus fomred contained substantially no free dicyclopentadiene, as indicated by the lack of any dicyclopentadiene odor.

60 grams of trisodium phosphate dodecahydrate (TSP) were dissolved and 12 grams of calcium carbonate were suspended in 220 pounds (100 kg.) of deionized water, and 380 grams of calcium chloride were dissolved in sufficient deionized water to form a 30% by weight solution. The TSP/CaCO$_3$ dispersion and CaCl$_2$ solution were then mixed to form a dispersion. With mechanical stirring, the dispersion was heated to 161°–162° C. in a pressure reactor; the final pressure was regulated to be 90 psig (60N/cm² gauge pressure) when the dispersion reached the indicated temperature. The pressure was sufficient to keep the water from boiling.

Next, 75 pounds (34 kg.) of the intermediate product, preheated to 125° C. to melt it, was charged to the pressure reactor and stirred into the water, forming a dispersion of the intermediate product. The temperature of the dispersion was regulated to 161°–162° C. and stirring was continued to maintain the dispersion. After a reaction time of about 75 minutes, the pressure vessel was vented to atmospheric pressure, thus rapidly reducing the temperature of its contents to about 80° C. to "quench" the reaction, while releasing hydrogen sulfide formed as a by-product. As a result of completion of the reaction, the dispersed droplets of the intermediate product had solidified to form uniform beads. The slurry of beads and water was discharged from the reactor, at which time the beads quickly settled. The supernatant liquid was removed and the beads were washed with water and dried. The average bead diameter was 1 mm.

EXAMPLES 15–20

The masterbatch (ingredients A–G) portion of each composition of Table X was prepared as described for Examples 4–7 above. Then for each example an 1190 g. sample of the masterbatch was placed in a Banbury mixer and the ingredients H–M in the amounts specified in Table X were added and mixed at 77 rpm until the mixture reached 104° C. for Examples 15–18 and at 116 rpm to a final temperature of 121° C. for Examples 19–20. The temperature was measured with the Banbury recording potentiometer. The stock was then removed from the Banbury, passed through the nip of a cool (40° C.) 12 inch by 18 inch laboratory mill, and immediately sheared off at 0.120 inches (3 mm) thickness, laid between sheets of release paper, and placed on a metal table to cool. Prior to molding samples for bloom evaluation, a 51 gram sample of the stock was placed in a Brabender for three minutes at 220° F. (104° C.) to warm it up. In a first group of samples (Part A) no additional Brabender processing was done. In a second group of samples (Part B) the samples were processed further in the Brabender for 1.5 minutes at 121° C. Part C samples were further processed for 1.5 minutes in the Brabender at 132° C. Each sample was removed from the Brabender and air-cooled, then passed six times through a tight, two-roll mill, and molded, prepared, and aged as described in Examples 4–7, except that only fingerprint samples were evaluated.

The samples were evaluated for blooming quantitatively, using reflectance measurements of the fingerprint areas. Reflectance measurements have been found to correlate quite well with visual or qualitative blooming determinations as used for Examples 4–7. The reflectometer used was a COLORGARD reflectometer, sold by Pacific Scientific Co., Gardner Neotec Instrument Division, Bethseda, Md. The light source was Source C light, having a spectrum similar to that of average daylight. A greater value for reflectance indicates more blooming.

The reflectance data is reported in Table IX, parts A, B, and C. Considering that Table IX, compare Examples 15, 17, and 19 in each part, using insoluble sulfur as the vulcanizing agent, with Examples 16 (corresponds to 15), 18 (corresponds to 17) and 20 (corresponds to 19) containing an equivalent amount of the curing agent of Example 14, according to the present invention. Uncured compositions containing the vulcanizing agent of the present invention show much lower reflectance, and thus much less blooming, than compositions containing insoluble sulfur.

Figure 2:
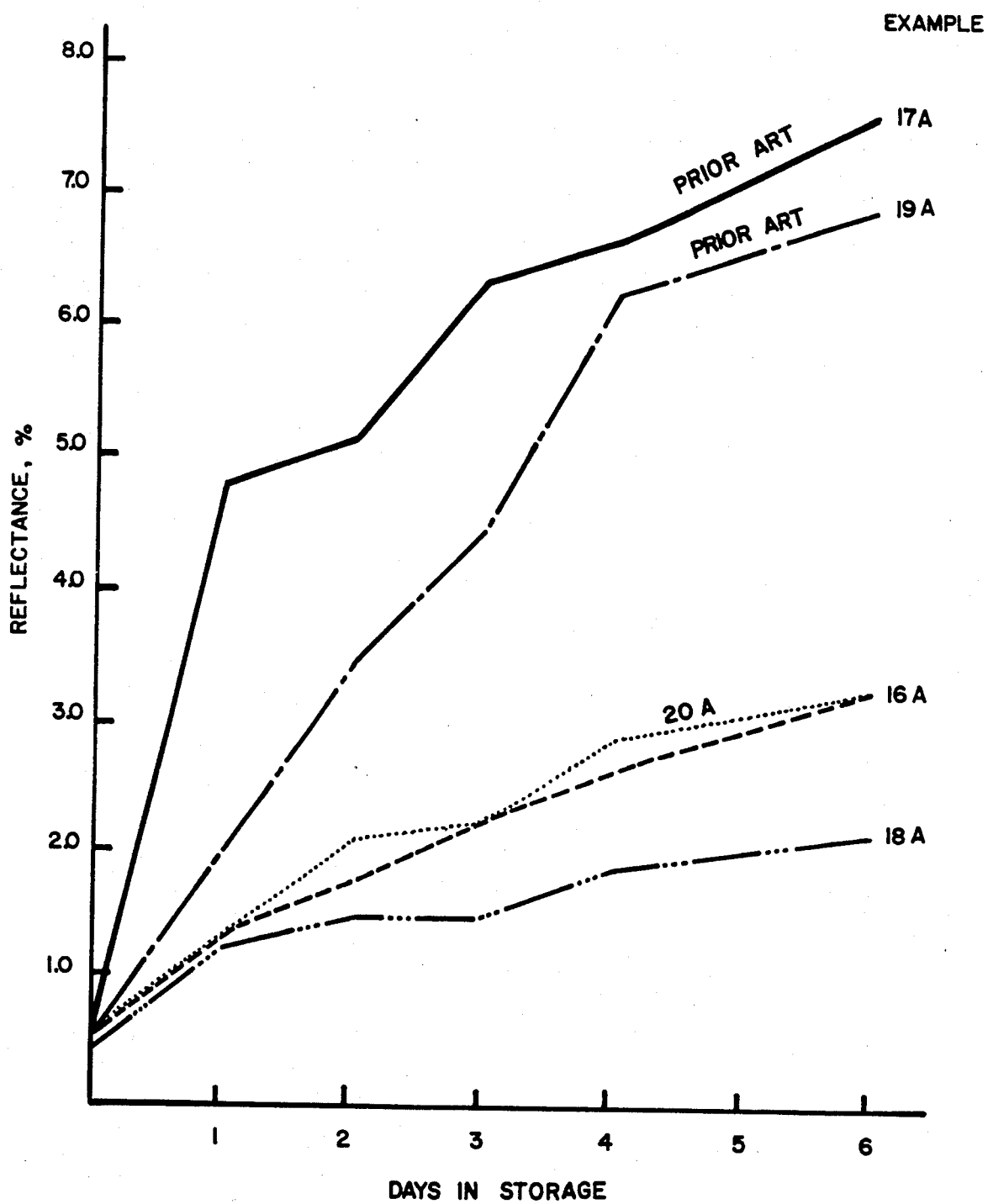
FIG. 2 is a graph of the reflectance (blooming) vs. storage time data set forth in Table IXA, Examples 16A-20A, illustrating that for compositions mixed at different temperatures, the prior art rubber compositions (top two plots) bloom much more than the present compositions (bottom three plots).
Figure 3:
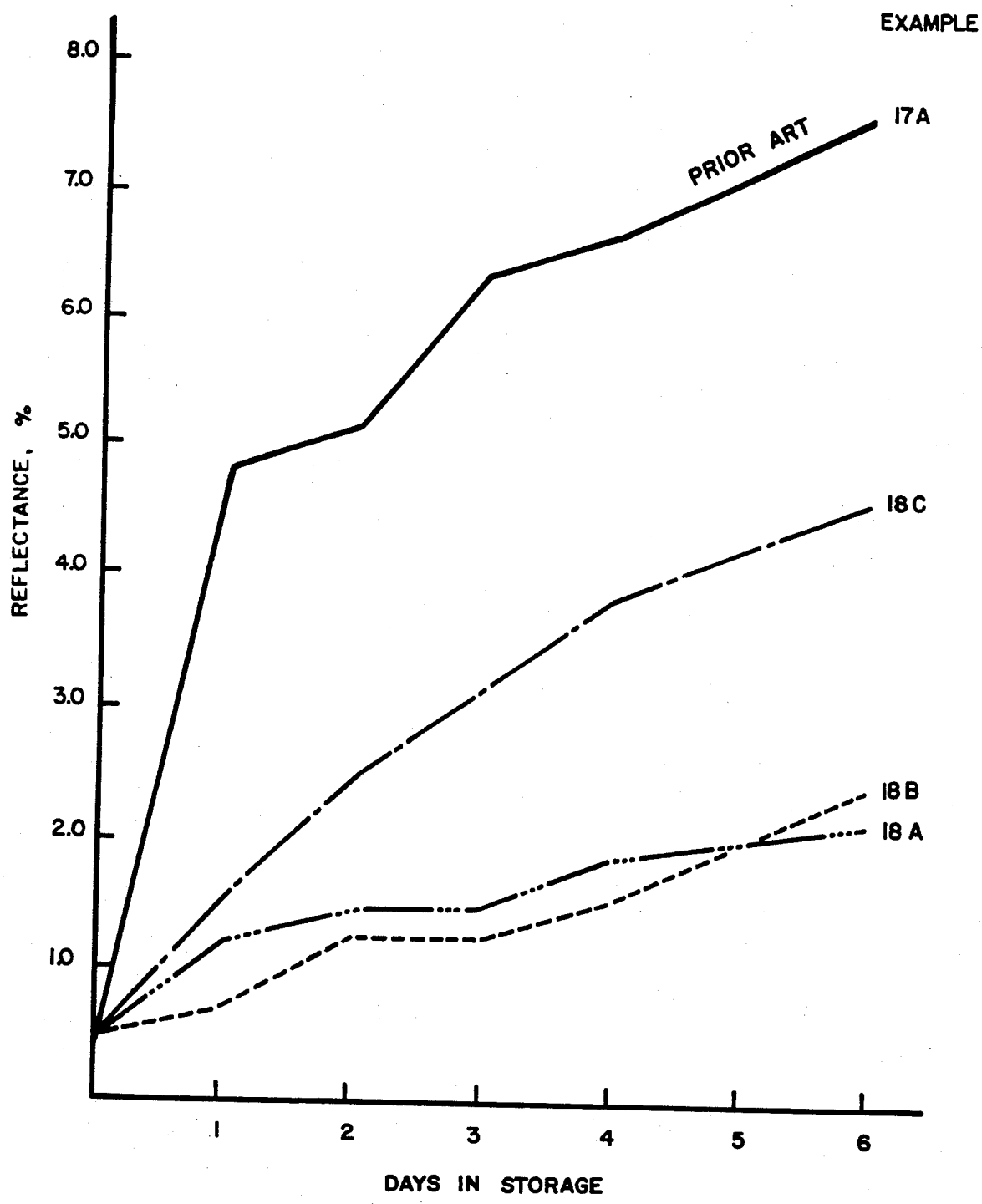
FIG. 3 is a graph of the reflectance (blooming) vs. storage time data set forth in Table IXA, B, and C, Examples 17A and 18A-C, illustrating that additional heat history changes the blooming characteristics of the present rubber compositions (bottom three plots), but that all three bloom less than prior art rubber compositions (top plot).

This conclusion is reinforced by FIGS. 1–3. In FIG. 1, the plots for Examples 15A and 17A, containing insoluble sulfur, show far more blooming than the plots for Examples 16A and 18A, containing the product of Example 14. All four plotted compositions have the same heat history and were processed at the same temperature; Example 17A and Example 19A have slightly different formulations, as do Examples 16A and 18A, but this formula difference had a much smaller effect on blooming than the choice of vulcanizing agent. FIG. 2 shows that blooming can be reduced somewhat in the insoluble sulfur formulation (Example 17A) by processing the mix at a higher temperature (shown in Example 19A), but this effect is much smaller than the effect of using the present vulcanizing agent (Examples 16A, 18A, and 20A). FIG. 3 shows that three identical formulations containing the vulcanizing agent of Example 14 (Examples 18A, 18B, and 18C) all show much less blooming than a similar composition (17A) in which insoluble sulfur is present to function as the curing agent. FIG. 3 also shows that additional heat history at 121° C. (18B) does not materially affect blooming, and that additional heat history at 132° C. (18C) increases blooming, but not enough to substantially counteract the benefits of the present invention.

The formulations of Examples 15–20 (Part A, Table IX) were also tested for Haake Plasticorder Scorch (32 rpm, 50 g batch, 121° C., X5 chart), and for Mooney scorch at 132° C. (270° F.) according to the procedure of ASTM D1646. The time in minutes to a five point rise (Mooney units) is reported in Table X. Rheometer (ASTM D2084) tests were run at 350° F. (177° C.); the measured minimum torque ($M_L$), maximum torque ($M_H$) (in-lb and cm-kg.), and Mooney scorch time ($t_s1$) in minutes to a one point rise (Mooney units) and time to t90 (a measure of curing time) were all measured, and are also reported in Table X. In every case, the Mooney scorch time for Examples 16, 18, and 20, according to the present invention is longer, and thus better, than the scorch times for Examples 15, 17, and 19, formulated with insoluble sulfur.

EXAMPLES 21–24

Wire adhesion tests were run for the vulcanizing agent of Example 14, this time using adhesion-promoting agents in the formula, but otherwise following the procedure of Examples 4–7. The formulations are set forth in Table XI, along with adhesion results in Newtons. The relevant comparisons are between Examples 21 (prior art) and 22 (invention), and between Examples 23 (prior art) and 24 (invention). The formulations employing vulcanizing agents according to the present invention show far better adhesion under steam aging and humidity aging conditions, which are an indication of continued ability of a rubber composition used in a tire to adhere to the wire of a steel belt under service conditions.

EXAMPLE 25

In this example a procedure like Example 1 was followed, but the second stage reaction in water dispersion was conducted at about 125° C. for about 32 hours. A product believed to be essentially the same as the product of Example 1 was formed.

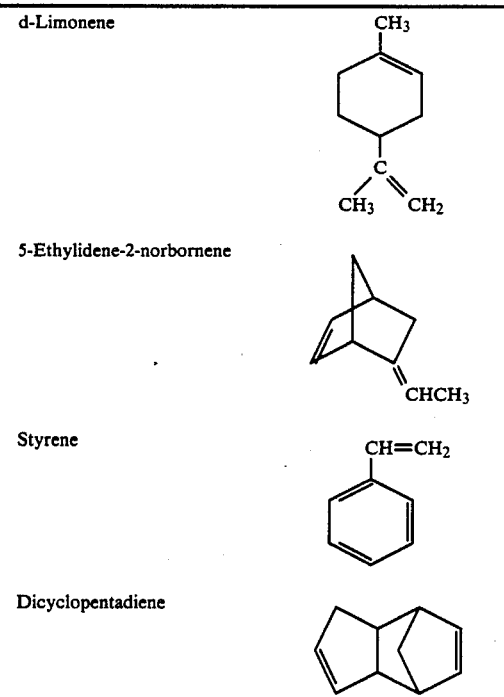

TABLE IIa

| Ingredient | Chemical Name |
|---|---|
| A | natural rubber (SMR-5 grade) |
| B | carbon black |
| C | zinc oxide |
| D | aromatic oil, ASTM D2226, Type 101 |
| E | stearic acid |
| F | N—phenyl-N'—(1,3-dimethylbutyl)-p-phenylenediamine |
| G | polymerized 2,2,4-trimethyl-1,2-dihydroquinoline |
| H | N—cyclohexyl-2-benzothiazyl sulfenamide |
| I | amorphous (insoluble) sulfur |

TABLE IIa-continued

| Ingredient | Chemical Name |
|---|---|
| J | rhombic (rubbermakers') sulfur |
| K | product of Example 1 |
| L | N,N'—dicyclohexyl-2-benzothiazyl sulfenamide |
| M | product of Example 14 |
| N | N—cyclohexyl-2-benzothiazyl sulfenamide dispersion (70% active) |
| O | amorphous (insoluble) sulfur |
| P | hexamethylenetetramine dispersion (65% active) |
| Q | precipitated silica |
| R | cobalt naphthenate 10.5% cobalt |
| S | resorcinol |
| T | N,N'—dicyclohexyl-2-benzothiazyl sulfenamide dispersion (70% active) |
| U | product like K, but 75% sulfur, 25% dicyclopentadiene |
| V | product like K, but 80% sulfur, 20% dicyclopentadiene |
| W | product like K, but 85% sulfur, 15% dicyclopentadiene |
| X | product like K, but 90% sulfur, 10% dicyclopentadiene |

TABLE IIb

| Ingredient | Trade Name | Supplier |
|---|---|---|
| A | — | |
| B | N-326 BLACK | J. J. Huber Corporation, Borger, TX |
| C | KADOX 15 | New Jersey Zinc Co., Bethlehem, PA |
| D | SUNDEX 790 | Sun Petroleum Products Co., Philadelphia, PA |
| E | — | |
| F | SANTOFLEX 13 | Monsanto Co., St. Louis, MO |
| G | AGERITE MA or FLECTOL H | R. T. Vanderbilt & Co., Newark, NJ Monsanto Co., St. Louis, MO |
| H | SANTOCURE CBS | Monsanto Co., St. Louis, MO |
| I | CRYSTEX 90 OT (80 S) | Stauffer Chemical Co., Westport, CT |
| J | — | H. M. Royal, Inc. Trenton, New Jersey |
| K | — | — |
| L | VULKACIT DZ | Mobay Chemical Corp. Pittsburgh, Pennsylvania |
| M | — | — |
| N | I(CBS) D-70 Polydispersion | Wyrough & Loser, Inc. Trenton, New Jersey |
| O | CRYSTEX HS OT 80 S | Stauffer Chemical Co. Westport, Connecticut |
| P | SHD-65 Polydispersion | Wyrough & Loser, Inc. Trenton, New Jersey |
| Q | HI-SIL 233 | PPG Industries, Chemical Div. Pittsburgh, Pennsylvania |
| R | cobalt naphthenate | — |
| S | resorcinol | — |
| T | I(DCBS) D70 Polydispersion | Wyrough & Loser, Inc. Trenton, New Jersey |
| U | — | — |
| V | — | — |
| W | — | — |
| X | — | — |

TABLE III

| | Parts by Weight (per hundred rubber) | | | |
|---|---|---|---|---|
| Ingredient** | 4* | 5* | 6* | 7* |
| A | 100.0 | 100.0 | 100.0 | 100.0 |
| B | 55.0 | 55.0 | 55.0 | 55.0 |
| C | 8.0 | 8.0 | 8.0 | 8.0 |
| D | 4.0 | 4.0 | 4.0 | 4.0 |
| E | 1.0 | 1.0 | 1.0 | 1.0 |
| F | 1.0 | 1.0 | 1.0 | 1.0 |
| G | 1.0 | 1.0 | 1.0 | 1.0 |
| H | 0.9 | 0.9 | 0.9 | 0.9 |
| I | 5.0 | — | — | — |
| J | — | 4.0 | — | — |
| K | — | — | 5.0 | 4.75 |

*example
**letters corresponding to those in Table II

TABLE IV

| Aging Designation | Time | Temperature | Humidity | Enclosure |
|---|---|---|---|---|
| Thermal (T) | 72 hours | 110° C. | low | hot air oven |
| Steam (S) | 72 hours | 120° C. | saturated steam | autoclave |
| Humid (H) | 7 days | 80° C. | 95–100% | humidity cabinet |
| Unaged (U) | — | — | — | ambient |

TABLE V

| | Wire Adhesion (Newtons) | | | |
|---|---|---|---|---|
| Aging Example | (U)* | (H)* | (T)* | (S)* |
| 4 (mean) | 286 | 281 | 293 | 214 |
| (Std. Deviation) | 25.6 | 22.6 | 28.8 | 27.9 |
| 5 (mean) | 334 | 276 | 274 | 238 |
| (Std. Deviation) | 26.3 | 20.5 | 26.6 | 26.8 |
| 6 (mean) | 257 | 305 | 221 | 348 |
| (Std. Deviation) | 19.8 | 29.9 | 22.3 | 36.9 |
| 7 (mean) | 286 | 395 | 225 | 307 |
| (Std. Deviation) | 35.1 | 17.1 | 48.8 | 37.5 |

*Aging designation (per Table IV)

TABLE VI (Ingredients of Examples 8-13)
(Ingredients A-G are part of masterbatch)

| | Parts by Weight (per hundred parts rubber) | | | | | |
|---|---|---|---|---|---|---|
| Ingredient** | 8* | 9* | 10* | 11* | 12* | 13* |
| A | 100.0 | 100.0 | 100.0 | 100.0 | 100.0 | 100.0 |
| B | 55.0 | 55.0 | 55.0 | 55.0 | 55.0 | 55.0 |
| C | 8.0 | 8.0 | 8.0 | 8.0 | 8.0 | 8.0 |
| D | 4.0 | 4.0 | 4.0 | 4.0 | 4.0 | 4.0 |
| E | 1.0 | 1.0 | 1.0 | 1.0 | 1.0 | 1.0 |
| F | 1.0 | 1.0 | 1.0 | 1.0 | 1.0 | 1.0 |
| G | 1.0 | 1.0 | 1.0 | 1.0 | 1.0 | 1.0 |
| I | 5.0 | — | — | — | — | — |
| O | — | 5.0 | — | — | — | — |
| T | 1.0 | 1.0 | 1.0 | 1.0 | 1.0 | 1.0 |
| U | — | — | 5.3 | — | — | — |
| V | — | — | — | 5.0 | — | — |
| W | — | — | — | — | 4.7 | — |
| X | — | — | — | — | — | 4.4 |

*example
**letters correspond to those in Table II

TABLE VII

| Example/ Sample | 1st Day | | | 2nd Day | | | 4th Day | | |
|---|---|---|---|---|---|---|---|---|---|
| | FP | SC | SS | FP | SC | SS | FP | SC | SS |
| 8 | −½ | −1 | −½ | −1½ | −2 | −1 | −2 | −2 | −1½ |
| 9 | −½ | 0 | +½ | −½ | 0 | +½ | −½ | −½ | −1 |
| 10/1 | +½ | +1 | +½ | +1½ | +2 | +1 | +2 | +2 | +1½ |
| /2 | +½ | +1 | +½ | +1½ | +2 | +1 | +2 | +2 | +1½ |
| /3 | +½ | +1 | +½ | +1½ | +2 | +1 | +2 | +2 | +1½ |
| /4 | +½ | +1 | +½ | +1½ | +2 | +1 | +1½ | +2 | +1½ |
| /5 | +½ | +1 | +½ | +1½ | +2 | +1 | +1½ | +2 | +1½ |
| /6 | +½ | +1 | +½ | +1½ | +2 | +1 | +1½ | +2 | +1½ |
| /7 | +½ | +1 | +½ | +1½ | +2 | +1 | +2 | +2 | +1½ |
| /8 | +½ | +1 | +½ | +1½ | +2 | +1 | +1½ | +2 | +1½ |
| 11/1 | +½ | +1 | +½ | +1½ | +2 | +1 | +1½ | +2 | +1½ |
| /2 | +½ | +1 | +½ | +1½ | +2 | +1 | +2 | +2 | +1½ |

TABLE VII-continued

| Example/ Sample | 1st Day FP | SC | SS | 2nd Day FP | SC | SS | 4th Day FP | SC | SS |
|---|---|---|---|---|---|---|---|---|---|
| /3 | +½ | +1 | +½ | +1½ | +2 | +1 | +2 | +2 | +1½ |
| /4 | +½ | +1 | +½ | +1½ | +2 | +1 | +2 | +2 | +1½ |
| /5 | +½ | +1 | +½ | +1½ | +2 | +1 | +2 | +2 | +1½ |
| /6 | +½ | +1 | +½ | +1½ | +2 | +1 | +2 | +2 | +1½ |
| /7 | +½ | +1 | +½ | +1½ | +2 | +1 | +1½ | +2 | +1½ |
| /8 | +½ | +1 | +½ | +1½ | +2 | +1 | +1½ | +2 | +1½ |
| 12/1 | 0 | 0 | +½ | −½ | −½ | +½ | −1 | −1 | −1 |
| /2 | −½ | −1 | +½ | −½ | −1 | +½ | −½ | +2 | −½ |
| /3 | 0 | +½ | +½ | −½ | +½ | +1 | −1 | +½ | 0 |
| /4 | +½ | +1 | +½ | +1 | +2 | +1 | +1 | +2 | +1½ |
| /5 | −1 | −1 | +½ | −½ | −½ | +½ | −1 | −1 | 0 |
| /6 | −1 | 0 | +½ | −½ | 0 | +½ | −1 | −1 | +½ |
| /7 | 0 | +1 | +½ | 0 | +1 | +1 | −1 | −1 | +1 |
| /8 | +½ | +½ | +½ | +½ | +1 | +1 | 0 | 0 | +½ |
| 13/1 | −2 | −1 | +½ | −2 | 0 | +½ | −2 | 0 | +1 |
| /2 | −2 | −2 | 0 | −2 | −2 | 0 | −2 | −2 | +1 |
| /3 | −2 | −2 | +½ | −2 | −1 | +½ | −2 | −1 | +1 |
| /4 | −2 | −1 | +½ | −2 | −1 | +½ | −1 | 0 | +1 |
| /5 | −2 | −2 | +½ | −2 | −2 | +½ | −2 | −2 | +½ |

TABLE VIII

| Example/ Sample | 1st Day FP | SC | SS | 2nd Day FP | SC | SS | 4th Day FP | SC | SS |
|---|---|---|---|---|---|---|---|---|---|
| 8 | −½ | −1 | −½ | −1½ | −2 | −1 | −2 | −2 | −1½ |
| 9 | −1 | −1 | 0 | −2 | −2 | −½ | −2½ | −2½ | −2½ |
| 10/1 | 0 | 0 | 0 | 0 | 0 | 0 | 0 | 0 | 0 |
| /2 | 0 | 0 | 0 | 0 | 0 | 0 | 0 | 0 | 0 |
| /3 | 0 | 0 | 0 | 0 | 0 | 0 | 0 | 0 | 0 |
| /4 | 0 | 0 | 0 | 0 | 0 | 0 | −½ | 0 | 0 |
| /5 | 0 | 0 | 0 | 0 | 0 | 0 | −½ | 0 | 0 |
| /6 | 0 | 0 | 0 | 0 | 0 | 0 | −½ | 0 | 0 |
| /7 | 0 | 0 | 0 | 0 | 0 | 0 | 0 | 0 | 0 |
| /8 | 0 | 0 | 0 | 0 | 0 | 0 | −½ | 0 | 0 |
| 11/1 | 0 | 0 | 0 | 0 | 0 | 0 | −½ | 0 | 0 |
| /2 | 0 | 0 | 0 | 0 | 0 | 0 | 0 | 0 | 0 |
| /3 | 0 | 0 | 0 | 0 | 0 | 0 | 0 | 0 | 0 |
| /4 | 0 | 0 | 0 | 0 | 0 | 0 | 0 | 0 | 0 |
| /5 | 0 | 0 | 0 | 0 | 0 | 0 | 0 | 0 | 0 |
| /6 | 0 | 0 | 0 | 0 | 0 | 0 | 0 | 0 | 0 |
| /7 | 0 | 0 | 0 | 0 | 0 | 0 | −½ | 0 | 0 |
| /8 | 0 | 0 | 0 | 0 | 0 | 0 | −½ | 0 | 0 |
| 12/1 | −½ | −1 | 0 | −2 | −2½ | −½ | −3 | −3 | −2½ |
| /2 | −1 | −2 | 0 | −2 | −3 | −½ | −2½ | 0 | −2 |
| /3 | −½ | −½ | 0 | −2 | −1½ | 0 | −3 | −1½ | −1½ |
| /4 | 0 | 0 | 0 | −½ | 0 | 0 | −1 | 0 | 0 |
| /5 | −1½ | −2 | 0 | −2 | −2½ | −½ | −3 | −3 | −1½ |
| /6 | −1½ | −1 | 0 | −2 | −2 | −½ | −3 | −3 | −1 |
| /7 | −½ | 0 | 0 | −1½ | −1 | 0 | −3 | −3 | −½ |
| /8 | 0 | −½ | 0 | −1 | −1 | 0 | −2 | −2 | −1 |
| 13/1 | −2½ | −2 | 0 | −3½ | −2 | −½ | −4 | −2 | −½ |
| /2 | −2½ | −3 | −½ | −3½ | −4 | −1 | −4 | −4 | −½ |
| /3 | −2½ | −3 | 0 | −3½ | −3 | −½ | −4 | −3 | −½ |
| /4 | −2½ | −2 | 0 | −3½ | −3 | −½ | −3 | −2 | −½ |
| /5 | −2½ | −3 | 0 | −3½ | −4 | −½ | −4 | −4 | −1 |

TABLE IX (Ingredients of Examples 15-20)
Ingredients A–G are part of masterbatch

| Ingredient** | Parts by Weight (per hundred parts rubber) 15* | 16* | 17* | 18* | 19* | 20* |
|---|---|---|---|---|---|---|
| A | 100.0 | 100.0 | 100.0 | 100.0 | 100.0 | 100.0 |
| B | 55.0 | 55.0 | 55.0 | 55.0 | 55.0 | 55.0 |
| C | 8.0 | 8.0 | 8.0 | 8.0 | 8.0 | 8.0 |
| D | 4.0 | 4.0 | 4.0 | 4.0 | 4.0 | 4.0 |
| E | 1.0 | 1.0 | 1.0 | 1.0 | 1.0 | 1.0 |
| F | 1.0 | 1.0 | 1.0 | 1.0 | 1.0 | 1.0 |
| G | 1.0 | 1.0 | 1.0 | 1.0 | 1.0 | 1.0 |
| H | .90 | .90 | — | — | — | — |
| I | 5.00 | — | 5.00 | — | 5.00 | — |
| L | | | .70 | .70 | .70 | .70 |
| M | | 5.00 | | 5.00 | | 5.00 |

TABLE IX-continued (Ingredients of Examples 15-20)
Ingredients A–G are part of masterbatch

| Processing Temperature °C.: | 104 | 104 | 104 | 104 | 121 | 121 |
|---|---|---|---|---|---|---|

Part A: No Additional Heat History

| Replicates: | 1 | 3 | 2 | 4 | 1 | 1 |
|---|---|---|---|---|---|---|
| Age Time | Reflectance (%) | | | | | |
| 1 day | 4.9 | 1.4 | 4.8 | 1.2 | 1.9 | 1.3 |
| 2 days | 7.0 | 1.8 | 5.2 | 1.4 | 3.5 | 2.1 |
| 3 days | 7.0 | 2.3 | 6.4 | 1.4 | 4.5 | 2.2 |
| 4 days | 7.8 | 2.7 | 6.7 | 1.8 | 6.3 | 2.9 |
| 6 days | 8.0 | 3.3 | 7.6 | 2.1 | 6.9 | 3.3 |

| Example | | | | | | |
|---|---|---|---|---|---|---|
| 15 | 16 | 17 | 18 | 19 | 20 |

Part B: Additional Heat History (1.5 Minutes in Brabender, 121° C.)

| Replicates: | — | — | 2 | 4 | 1 | 1 |
|---|---|---|---|---|---|---|
| Age Time | Reflectance (%) | | | | | |
| 1 day | — | — | 1.3 | 0.8 | 5.2 | 0.9 |
| 2 days | — | — | 1.7 | 1.3 | 6.3 | 1.3 |
| 3 days | — | — | 2.3 | 1.3 | 6.9 | 1.6 |
| 4 days | — | — | 2.6 | 1.6 | 7.3 | 2.1 |
| 6 days | — | — | 3.1 | 2.4 | 7.5 | 2.9 |

Part C - Additional Heat History (1.5 Minutes in Brabender, 132° C.)

| Replicates: | — | — | 1 | 4 | 1 | 1 |
|---|---|---|---|---|---|---|
| Age Time | Reflectance (%) | | | | | |
| 1 day | — | — | 4.6 | 1.6 | 1.4 | 1.1 |
| 2 days | — | — | 4.5 | 2.5 | 1.8 | 2.0 |
| 4 days | — | — | 5.4 | 3.8 | 2.8 | 3.1 |
| 6 days | — | — | 6.2 | 4.6 | 3.0 | 4.0 |

*Example
**Ingredients as listed in Table II

TABLE X

| | Example | | | | | |
|---|---|---|---|---|---|---|
| | 15 | 16 | 17 | 18 | 19 | 20 |
| Haake Plasticorder Scorch | | | | | | |
| minimum torque at 121° C. (meter-grams) | 33.0 | 33.5 | 34.8 | 33.6 | 35.0 | 31.0 |
| time to +2% at 121° C. (minutes): | 6.25 | 8.25 | 5.00 | 10.00 | 4.25 | 10.50 |
| minimum torque at 132° C. (meter-grams) | 35.8 | 33.3 | 36.8 | 33.8 | 35.0 | 30.9 |
| time to +2% at 132° C. (minutes) | 1.12 | 1.97 | 0.84 | 2.25 | 0.87 | 2.63 |
| Mooney Scorch (ASTM D1646) | | | | | | |
| time to +5, minutes: | 8.95 | 11.00 | 10.70 | 17.80 | 9.60 | 17.90 |
| Rheometer (ASTM D2084) | | | | | | |
| $M_L$ (in.-lb.): | 2.5 | 2.3 | 2.4 | 2.1 | 2.5 | 1.5 |
| (cm.-kg.): | 2.9 | 2.6 | 2.8 | 2.4 | 2.9 | 1.7 |
| $t_{sl}$, minutes: | 1.9 | 2.1 | 2.0 | 2.6 | 1.9 | 1.9 |
| time to t90, minutes | 3.0 | 3.0 | 4.9 | 5.0 | 2.9 | 2.6 |
| $M_H$ (in.-lb.): | 33.5 | 30.6 | 26.7 | 26.7 | 27.8 | 25.8 |
| (cm.-kg.): | 38.6 | 35.3 | 30.8 | 30.8 | 32.0 | 29.7 |

TABLE XI

| | Example, phr | | | |
|---|---|---|---|---|
| | 21 | 22 | 23 | 24 |
| Ingredient | | | | |
| A | 100.0 | 100.0 | 100.0 | 100.0 |
| B | 55.0 | 55.0 | 55.0 | 55.0 |

TABLE XI-continued

| | Example, phr | | | |
|---|---|---|---|---|
| | 21 | 22 | 23 | 24 |
| C | 8.0 | 8.0 | 8.0 | 8.0 |
| D | 4.0 | 4.0 | 4.0 | 4.0 |
| E | 1.0 | 1.0 | 1.0 | 1.0 |
| F | 1.0 | 1.0 | 1.0 | 1.0 |
| G | 1.0 | 1.0 | 1.0 | 1.0 |
| I | 5.00 | — | 5.00 | — |
| M | — | 5.25 | — | 5.25 |
| N | 1.29 | 1.29 | — | — |
| P | 2.30 | 2.30 | 2.30 | 2.30 |
| Q | 10.00 | 10.00 | 10.00 | 10.00 |
| R | .50 | .50 | .50 | .50 |
| S | 2.50 | 2.50 | 2.50 | 2.50 |
| T | — | — | 1.00 | 1.00 |
| Adhesion Results | | | | |
| UNAGED, Newtons | 610 | 535 | 586 | 543 |
| (Std. Deviation) | (37.5) | (34.0) | (37.5) | (39.0) |
| OVEN AGED, Newtons | 498 | 481 | 482 | 457 |
| (Std. Deviation) | (21.0) | (38.0) | (37.1) | (20.2) |
| STEAM AGED, Newtons | 146 | 405 | 124 | 260 |
| (Std. Deviation) | N.C.* | N.C. | N.C. | N.C. |
| HUMIDITY AGED, Newtons | 110 | 143 | 142 | 258 |
| (Std. Deviation) | (8.0) | (35.3) | (24.6) | (55.8) |

*not calculated

What is claimed is:

1. A substantially non-blooming unvulcanized rubber composition comprising rubber and an amount of a vulcanizing agent effective to vulcanize said rubber when said composition is heated, wherein said vulcanizing agent is a product made according to the following process:
    A. providing starting materials consisting essentially of sulfur and an unsaturated reactant selected from at least one of d-limonene, 5-ethylidene-2-norbornene, styrene, and dicyclopentadiene;
    B. reacting said starting materials at a first temperature greater than the melting point of said sulfur and less than the temperature at which said sulfur begins to be converted to insoluble sulfur until substantially all of said unsaturated reactant is consumed, forming an intermediate product;
    C. maintaining said intermediate product at a second temperature greater than the melting point of said sulfur and the same as or different from said first temperature for a sufficient time to form an end product which is dispersible in rubber and provides less sulfur bloom than insoluble sulfur when incorporated in a rubber composition; and
    D. terminating said maintaining step by reducing the temperature of said end product, thereby maintaining the dispersibility of said end product in rubber.

2. A vulcanizate formed by curing the composition of claim 1.

3. In a method for vulcanizing rubber by reacting rubber and a vulcanizing agent, the improvement wherein said vulcanizing agent is a product made according to the following process:
    A. providing starting materials consisting essentially of sulfur and an unsaturated reactant selected from at least one of d-limonene, 5-ethylidene-2-norbornene, styrene, and dicyclopentadiene;
    B. reacting said starting materials at a first temperature greater than the melting point of said sulfur and less than the temperature at which said sulfur begins to be converted to insoluble sulfur until substantially all of said unsaturated reactant is consumed, forming an intermediate product;
    C. maintaining said intermediate product at a second temperature greater than the melting point of said sulfur and the same as or different from said first temperature for a sufficient time to form an end product which is dispersible in rubber and provides less sulfur bloom than insoluble sulfur when incorporated in a rubber composition; and
    D. terminating said maintaining step by reducing the temperature of said end product, thereby maintaining the dispersibility of said end product in rubber.

4. A vulcanized rubber article made according to the method of claim 3.

5. A method for increasing the adhesion of rubber to a substrate, comprising the steps of:
    A. providing a vulcanizing agent which has been made by the process of:
        1. providing starting materials consisting essentially of sulfur and an unsaturated reactant selected from at least one of d-limonene, 5-ethylidene-2-norbornene, styrene, and dicyclopentadiene;
        2. reacting said starting materials at a first temperature greater than the melting point of said sulfur and less than the temperature at which said sulfur begins to be converted to insoluble sulfur until substantially all of said unsaturated reactant is consumed, forming an intermediate product;
        3. maintaining said intermediate product at a second temperature greater than the melting point of said sulfur and the same as or different from said first temperature for a sufficient time to form an end product which is dispersible in rubber and provides less sulfur bloom than insoluble sulfur when incorporated in a rubber composition; and
        4. terminating said maintaining step by reducing the temperature of said end product, thereby maintaining the dispersibility of said end product in rubber;
    B. blending said rubber with said vulcanizing agent to form a blend; and
    C. vulcanizing said blend while in intimate contact with a substrate.

6. The method of claim 5, wherein said substrate is selected from a rubber ply and tire cord material.

7. A substantially non-blooming unvulcanized rubber composition comprising rubber and an amount of a vulcanizing agent effective to vulcanize said rubber when said composition is heated, wherein said vulcanizing agent is produced by a process comprising the steps of:
    A. providing starting materials consisting essentially of sulfur and dicyclopentadiene;
    B. reacting said starting materials at a first temperature greater than the melting point of said sulfur until substantially all of said dicyclopentadiene is consumed, forming an intermediate product which is a liquid at said first temperature;
    C. suspending said intermediate product in liquid water to form a dispersion;
    D. maintaining said dispersion at a second temperature greater than the melting point of said sulfur and the same as or different from said first temperature for a sufficient time to form beads of an end product which is dispersible in rubber and provides less sulfur bloom than insoluble sulfur when incorporated in a rubber composition;
    E. separating said water and said beads; and
    F. before or after said separating step, terminating said maintaining step by reducing the temperature of said end product, thereby maintaining the dispersibility of said end product in rubber.

* * * * *